US008712830B2

(12) United States Patent  
Barnett et al.

(10) Patent No.: US 8,712,830 B2
(45) Date of Patent: Apr. 29, 2014

(54) METHOD AND SYSTEM FOR ELECTRONIC DISTRIBUTION OF PRODUCT REDEMPTION COUPONS

(75) Inventors: Craig W. Barnett, Princeton, NJ (US); Karen R. Reisner, Princeton, NJ (US); Mark Braunstein, New York, NY (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1940 days.

(21) Appl. No.: 09/879,825

(22) Filed: Jun. 12, 2001

(65) Prior Publication Data

US 2002/0087405 A1 Jul. 4, 2002

Related U.S. Application Data

(63) Continuation of application No. 08/425,185, filed on Apr. 19, 1995, now Pat. No. 6,321,208.

(51) Int. Cl.
G06Q 30/00 (2012.01)
G06Q 30/02 (2012.01)

(52) U.S. Cl.
CPC ...................................... *G06Q 30/02* (2013.01)
USPC .......................................................... 705/14

(58) Field of Classification Search
CPC .................................................... G06Q 30/02
USPC .......................................................... 705/14
See application file for complete search history.

(56) References Cited

U.S. PATENT DOCUMENTS 2,995,727 A  8/1961 Quade
3,095,653 A  7/1963 Corrigan
3,316,536 A  4/1967 Andrews et al.

(Continued)

FOREIGN PATENT DOCUMENTS

CA  1172847  8/1984
GB  1287304  8/1972

(Continued)

OTHER PUBLICATIONS

"In Search of Mall Rats", *Direct*, V. 3, No. 11, p. 10, Nov. 1991, Dialog File 570, Accession No. 01235027.

(Continued)

*Primary Examiner* — Arthur Duran
(74) *Attorney, Agent, or Firm* — Pillsbury Winthrop Shaw Pittman LLP

(57) ABSTRACT

Provided is a method and system for the electronic distribution of product redemption coupons to remote personal computers located at users' homes. A centrally located repository, such as an online service provider or web site on the Internet, stores packages of coupon data for downloading on demand to the user's computer. The user may view, select, sort and print desired coupons from the downloaded package. The user's demographic as well as coupon selection data is provided back to the online service and coupon distributor and issuers for subsequent marketing analysis. The online service can perform subsequent coupon processing on previously downloaded coupon packages such as variation of discount amounts. The online service provider can also determine how many times a particular coupon was viewed. When the printed coupons are presented at a retail store, the discount is provided to the user. Upon redemption by the store via a coupon redeeming center, transaction data is also supplied to the coupon issuers and distributor for integration into marketing analysis. The electronic coupon system is secure due to the inclusion of user-specific identification indicia printed thereon.

10 Claims, 8 Drawing Sheets

(56) References Cited

U.S. PATENT DOCUMENTS

| | | |
|---|---|---|
| 3,465,289 A | 9/1969 | Klein |
| 3,546,791 A | 12/1970 | Koos et al. |
| 3,599,221 A | 8/1971 | Baer |
| 3,606,688 A | 9/1971 | Zawels et al. |
| 3,671,668 A | 6/1972 | Reiffel |
| 3,792,437 A | 2/1974 | Blumenthal et al. |
| 3,810,627 A | 5/1974 | Levy |
| 3,848,082 A | 11/1974 | Summers |
| 3,889,062 A | 6/1975 | Epstein |
| 3,899,775 A | 8/1975 | Larsen |
| 3,910,322 A | 10/1975 | Hardesty, Jr. et al. |
| 3,964,179 A | 6/1976 | Bennett |
| 3,993,861 A | 11/1976 | Baer |
| 3,999,307 A | 12/1976 | Tsuda et al. |
| 4,012,132 A | 3/1977 | Lazarus |
| 4,014,004 A | 3/1977 | Fuller |
| 4,044,380 A | 8/1977 | Justice et al. |
| 4,052,798 A | 10/1977 | Tomita et al. |
| 4,071,697 A | 1/1978 | Bushnell et al. |
| 4,071,740 A | 1/1978 | Gogulski |
| 4,124,109 A | 11/1978 | Bissell et al. |
| 4,141,078 A | 2/1979 | Bridges, Jr. et al. |
| 4,141,548 A | 2/1979 | Everton |
| 4,166,540 A | 9/1979 | Marshall |
| 4,208,652 A | 6/1980 | Marshall |
| 4,210,961 A | 7/1980 | Whitlow et al. |
| 4,247,759 A | 1/1981 | Yuris et al. |
| RE30,579 E | 4/1981 | Goldman et al. |
| RE30,580 E | 4/1981 | Goldman et al. |
| 4,264,924 A | 4/1981 | Freeman |
| 4,268,744 A | 5/1981 | McGeary |
| 4,271,351 A | 6/1981 | Bloodworth |
| 4,286,323 A | 8/1981 | Meday |
| 4,290,688 A | 9/1981 | Call |
| 4,329,684 A | 5/1982 | Monteath et al. |
| 4,331,973 A | 5/1982 | Eskin et al. |
| 4,339,798 A | 7/1982 | Hedges et al. |
| 4,355,372 A | 10/1982 | Johnson et al. |
| 4,359,631 A | 11/1982 | Lockwood et al. |
| 4,373,133 A | 2/1983 | Clyne et al. |
| 4,377,870 A | 3/1983 | Anderson et al. |
| 4,388,008 A | 6/1983 | Greene et al. |
| 4,396,985 A | 8/1983 | Ohara |
| 4,449,186 A | 5/1984 | Kelly et al. |
| 4,451,701 A | 5/1984 | Bendig |
| 4,458,320 A | 7/1984 | Sutton |
| 4,484,328 A | 11/1984 | Schlafly |
| 4,494,197 A | 1/1985 | Troy et al. |
| 4,500,880 A | 2/1985 | Gomersall et al. |
| 4,541,806 A | 9/1985 | Zimmerman et al. |
| 4,546,382 A | 10/1985 | McKenna et al. |
| 4,554,446 A | 11/1985 | Murphy et al. |
| 4,573,072 A | 2/1986 | Freeman |
| RE32,115 E | 4/1986 | Lockwood et al. |
| 4,588,881 A | 5/1986 | Pejas et al. |
| 4,592,546 A | 6/1986 | Fascenda et al. |
| 4,593,904 A | 6/1986 | Graves |
| 4,597,046 A | 6/1986 | Musmanno et al. |
| 4,602,279 A | 7/1986 | Freeman |
| 4,603,232 A | 7/1986 | Kurland et al. |
| 4,608,601 A | 8/1986 | Shreck et al. |
| 4,611,996 A | 9/1986 | Stoner |
| 4,614,342 A | 9/1986 | Takashima |
| 4,625,275 A | 11/1986 | Smith |
| 4,630,040 A | 12/1986 | Haertling |
| 4,630,108 A | 12/1986 | Gomersall |
| 4,634,147 A | 1/1987 | McClure |
| 4,636,950 A | 1/1987 | Caswell et al. |
| 4,642,767 A | 2/1987 | Lerner |
| 4,646,145 A | 2/1987 | Percy et al. |
| 4,658,290 A | 4/1987 | McKenna et al. |
| 4,670,853 A | 6/1987 | Stepien |
| 4,671,772 A | 6/1987 | Slade et al. |
| 4,674,041 A | 6/1987 | Lemon et al. |
| 4,689,742 A | 8/1987 | Troy et al. |
| 4,699,532 A | 10/1987 | Smith |
| 4,703,423 A | 10/1987 | Bado et al. |
| 4,713,761 A | 12/1987 | Sharpe et al. |
| 4,723,212 A | 2/1988 | Mindrum et al. |
| 4,734,858 A | 3/1988 | Schlafly |
| 4,745,468 A | 5/1988 | Von Kohorn |
| 4,750,151 A | 6/1988 | Baus |
| 4,752,877 A | 6/1988 | Roberts et al. |
| 4,760,527 A | 7/1988 | Sidley |
| 4,774,663 A | 9/1988 | Musmanno et al. |
| 4,775,935 A | 10/1988 | Yourick |
| 4,791,281 A | 12/1988 | Johnsen et al. |
| 4,792,018 A | 12/1988 | Humble et al. |
| 4,794,530 A | 12/1988 | Yukiura et al. |
| 4,807,031 A | 2/1989 | Broughton et al. |
| 4,812,986 A | 3/1989 | Smith |
| 4,816,904 A | 3/1989 | McKenna et al. |
| 4,821,101 A | 4/1989 | Short |
| 4,825,045 A | 4/1989 | Humble |
| 4,833,710 A | 5/1989 | Hirashima |
| 4,839,829 A | 6/1989 | Freedman |
| 4,842,278 A | 6/1989 | Markowicz |
| 4,847,690 A | 7/1989 | Perkins |
| 4,853,882 A | 8/1989 | Marshall |
| 4,856,787 A | 8/1989 | Itkis |
| 4,858,000 A | 8/1989 | Lu |
| 4,870,596 A | 9/1989 | Smith |
| 4,875,164 A | 10/1989 | Monfort |
| 4,876,592 A | 10/1989 | Von Kohorn |
| 4,882,675 A * | 11/1989 | Nichtberger et al. ............ 705/14 |
| 4,882,724 A | 11/1989 | Vela et al. |
| 4,890,321 A | 12/1989 | Seth-Smith et al. |
| 4,894,784 A | 1/1990 | Smith |
| 4,896,791 A | 1/1990 | Smith |
| 4,907,079 A | 3/1990 | Turner et al. |
| 4,908,761 A | 3/1990 | Tai |
| 4,910,672 A | 3/1990 | Off et al. |
| 4,922,522 A | 5/1990 | Scanlon |
| 4,926,255 A | 5/1990 | Von Kohorn |
| 4,926,256 A | 5/1990 | Nanba |
| 4,929,819 A | 5/1990 | Collins, Jr. |
| 4,930,011 A | 5/1990 | Kiewit |
| 4,937,742 A | 6/1990 | Marshall |
| 4,937,853 A | 6/1990 | Brule et al. |
| 4,949,256 A | 8/1990 | Humble |
| 4,959,686 A | 9/1990 | Spallone et al. |
| 4,959,783 A | 9/1990 | Scott et al. |
| 4,965,437 A | 10/1990 | Nagai |
| 4,972,504 A | 11/1990 | Daniel, Jr. et al. |
| 4,973,952 A | 11/1990 | Malec et al. |
| 4,974,170 A | 11/1990 | Bouve et al. |
| 4,975,951 A | 12/1990 | Bennett |
| 4,982,337 A | 1/1991 | Burr et al. |
| 4,982,346 A | 1/1991 | Girouard |
| 4,984,156 A | 1/1991 | Mekata |
| 4,996,705 A | 2/1991 | Entenmann et al. |
| 5,003,384 A | 3/1991 | Durden et al. |
| 5,003,472 A | 3/1991 | Perril et al. |
| 5,010,845 A | 4/1991 | Bigari |
| 5,014,125 A | 5/1991 | Pocock et al. |
| 5,014,212 A | 5/1991 | Smith |
| 5,034,807 A | 7/1991 | Von Kohorn |
| 5,039,848 A | 8/1991 | Stoken |
| 5,047,614 A | 9/1991 | Bianco |
| 5,048,833 A | 9/1991 | Lamle |
| 5,057,915 A | 10/1991 | Von Kohorn |
| 5,063,610 A | 11/1991 | Alwadish |
| 5,069,453 A | 12/1991 | Koza et al. |
| 5,070,404 A | 12/1991 | Bullock et al. |
| 5,077,607 A | 12/1991 | Johnson et al. |
| 5,083,272 A | 1/1992 | Walker et al. |
| 5,093,718 A | 3/1992 | Hoarty et al. |
| 5,111,196 A | 5/1992 | Hunt |
| 5,111,927 A | 5/1992 | Schulze, Jr. |
| 5,117,355 A | 5/1992 | McCarthy |
| 5,119,295 A | 6/1992 | Kapur |
| 5,128,520 A | 7/1992 | Rando et al. |
| 5,128,752 A | 7/1992 | Von Kohorn |
| 5,155,591 A | 10/1992 | Wachob |

(56) References Cited

U.S. PATENT DOCUMENTS

| | | | |
|---|---|---|---|
| 5,158,310 A | 10/1992 | Tannehill et al. | |
| 5,159,549 A | 10/1992 | Hallman, Jr. et al. | |
| 5,173,594 A | 12/1992 | McClure | |
| 5,173,851 A | 12/1992 | Off et al. | |
| 5,176,224 A | 1/1993 | Spector | |
| 5,179,652 A | 1/1993 | Rozmanith et al. | |
| 5,185,695 A | 2/1993 | Pruchnicki | |
| 5,192,854 A | 3/1993 | Counts | |
| 5,193,056 A | 3/1993 | Boes | |
| 5,202,826 A | 4/1993 | McCarthy | |
| 5,208,445 A | 5/1993 | Nahar et al. | |
| 5,214,792 A | 5/1993 | Alwadish | |
| 5,227,874 A * | 7/1993 | Von Kohorn | 705/10 |
| 5,235,509 A | 8/1993 | Mueller et al. | |
| 5,237,157 A | 8/1993 | Kaplan | |
| 5,237,499 A | 8/1993 | Garback | |
| 5,239,480 A | 8/1993 | Huegel | |
| 5,243,174 A | 9/1993 | Veeneman et al. | |
| 5,249,044 A | 9/1993 | Von Kohorn | |
| 5,250,789 A | 10/1993 | Johnsen | |
| 5,278,752 A | 1/1994 | Narita et al. | |
| 5,283,731 A | 2/1994 | Lalonde et al. | |
| 5,283,734 A | 2/1994 | Von Kohorn | |
| 5,285,278 A | 2/1994 | Holman | |
| 5,287,181 A | 2/1994 | Holman | |
| 5,287,268 A | 2/1994 | McCarthy | |
| 5,295,064 A | 3/1994 | Malec et al. | |
| 5,305,195 A | 4/1994 | Murphy | |
| 5,305,197 A | 4/1994 | Axler et al. | |
| 5,310,997 A | 5/1994 | Roach et al. | |
| 5,327,066 A | 7/1994 | Smith | |
| 5,350,197 A | 9/1994 | Schmidt | |
| 5,351,186 A | 9/1994 | Bullock et al. | |
| 5,353,218 A | 10/1994 | De Lapa et al. | |
| 5,368,129 A | 11/1994 | Von Kohorn | |
| 5,380,991 A * | 1/1995 | Valencia et al. | 235/383 |
| 5,382,970 A | 1/1995 | Kiefl | |
| 5,401,946 A | 3/1995 | Weinblatt | |
| RE34,915 E | 4/1995 | Nichtberger et al. | |
| 5,410,326 A | 4/1995 | Goldstein | |
| 5,410,692 A | 4/1995 | Torres | |
| 5,412,191 A | 5/1995 | Baitz et al. | |
| 5,412,416 A | 5/1995 | Nemirofsky | |
| 5,420,606 A | 5/1995 | Begum et al. | |
| 5,430,644 A | 7/1995 | Deaton et al. | |
| 5,438,355 A | 8/1995 | Palmer | |
| 5,446,919 A | 8/1995 | Wilkins | |
| 5,448,471 A | 9/1995 | Deaton | |
| 5,459,306 A | 10/1995 | Stein et al. | |
| 5,465,206 A | 11/1995 | Hilt et al. | |
| 5,488,423 A | 1/1996 | Walkingshaw et al. | |
| 5,490,060 A | 2/1996 | Malec et al. | |
| 5,500,514 A | 3/1996 | Veeneman et al. | |
| 5,500,681 A | 3/1996 | Jones | |
| 5,502,636 A | 3/1996 | Clarke | 364/401 |
| 5,504,519 A | 4/1996 | Remillard | |
| 5,508,731 A | 4/1996 | Von Kohorn | |
| 5,513,126 A | 4/1996 | Harkins et al. | |
| 5,515,098 A | 5/1996 | Carles | |
| 5,523,794 A | 6/1996 | Mankovitz et al. | |
| 5,528,490 A | 6/1996 | Hill | |
| 5,557,518 A | 9/1996 | Rosen | |
| 5,557,721 A | 9/1996 | Fite et al. | |
| 5,584,025 A | 12/1996 | Keithley et al. | |
| 5,585,858 A | 12/1996 | Harper et al. | |
| 5,592,378 A * | 1/1997 | Cameron et al. | 705/26.62 |
| 5,592,379 A | 1/1997 | Finfrock et al. | |
| 5,592,560 A | 1/1997 | Deaton et al. | |
| 5,594,910 A | 1/1997 | Filepp et al. | |
| 5,604,542 A | 2/1997 | Dedrick | |
| 5,612,527 A | 3/1997 | Ovadia | |
| 5,612,868 A | 3/1997 | Off et al. | |
| 5,621,812 A | 4/1997 | Deaton et al. | |
| 5,630,125 A | 5/1997 | Zellweger | |
| 5,634,101 A | 5/1997 | Blau | |
| 5,635,979 A | 6/1997 | Kostreski et al. | |
| 5,636,346 A | 6/1997 | Saxe | |
| 5,638,457 A | 6/1997 | Deaton et al. | |
| 5,644,723 A | 7/1997 | Deaton et al. | |
| 5,647,677 A | 7/1997 | Smith | |
| 5,649,114 A | 7/1997 | Deaton et al. | |
| 5,651,238 A | 7/1997 | Belec et al. | |
| 5,655,961 A | 8/1997 | Acres et al. | |
| 5,659,469 A | 8/1997 | Deaton et al. | |
| 5,659,793 A | 8/1997 | Escobar et al. | |
| 5,664,111 A | 9/1997 | Nahan et al. | |
| 5,664,771 A | 9/1997 | Nagatani et al. | |
| 5,687,322 A * | 11/1997 | Deaton et al. | 705/14.25 |
| 5,689,648 A | 11/1997 | Diaz et al. | |
| 5,694,323 A | 12/1997 | Koropitzer et al. | |
| 5,694,546 A | 12/1997 | Reisman | |
| 5,696,965 A | 12/1997 | Dedrick | |
| 5,697,844 A | 12/1997 | Von Kohorn | |
| 5,701,161 A | 12/1997 | Williams et al. | |
| 5,703,795 A | 12/1997 | Mankovitz | |
| 5,708,782 A | 1/1998 | Larson et al. | 395/214 |
| 5,710,884 A | 1/1998 | Dedrick | |
| 5,710,886 A | 1/1998 | Christensen et al. | 395/214 |
| 5,715,314 A | 2/1998 | Payne et al. | |
| 5,717,923 A | 2/1998 | Dedrick | |
| 5,724,521 A | 3/1998 | Dedrick | |
| 5,724,525 A | 3/1998 | Beyers, II et al. | |
| 5,729,693 A | 3/1998 | Holda-Fleck | |
| 5,734,719 A | 3/1998 | Tsevdos et al. | |
| 5,734,720 A | 3/1998 | Salganicoff | |
| 5,734,823 A * | 3/1998 | Saigh et al. | 709/229 |
| 5,743,745 A | 4/1998 | Reintjes | |
| 5,752,238 A | 5/1998 | Dedrick | |
| 5,754,787 A | 5/1998 | Dedrick | |
| 5,758,257 A | 5/1998 | Herz et al. | |
| 5,759,101 A | 6/1998 | Von Kohorn | |
| 5,761,648 A | 6/1998 | Golden et al. | |
| 5,761,662 A | 6/1998 | Dasan | |
| 5,768,521 A | 6/1998 | Dedrick | |
| 5,774,868 A | 6/1998 | Cragun et al. | |
| 5,793,849 A | 8/1998 | Young et al. | |
| 5,812,647 A | 9/1998 | Beaumont et al. | |
| 5,826,241 A | 10/1998 | Stein et al. | |
| 5,832,457 A | 11/1998 | O'Brien et al. | |
| 5,839,117 A | 11/1998 | Cameron et al. | |
| 5,848,399 A * | 12/1998 | Burke | 705/27.2 |
| RE36,116 E | 2/1999 | McCarthy | |
| 5,870,724 A | 2/1999 | Lawlor et al. | |
| 5,877,755 A | 3/1999 | Hellhake | |
| 5,909,673 A * | 6/1999 | Gregory | 705/45 |
| 5,974,396 A | 10/1999 | Anderson et al. | |
| 6,099,043 A | 8/2000 | Story | |
| 6,185,501 B1 | 2/2001 | Smith et al. | |
| 6,321,210 B1 | 11/2001 | O'Brien et al. | |
| 6,411,943 B1 | 6/2002 | Crawford | |
| 6,487,362 B1 | 11/2002 | Yuen et al. | |
| 7,080,051 B1 | 7/2006 | Crawford | |
| 2005/0177716 A1* | 8/2005 | Ginter et al. | 713/157 |

FOREIGN PATENT DOCUMENTS

| | | |
|---|---|---|
| GB | 2120507 | 11/1983 |
| JP | 410312415 A | 11/1998 |
| WO | WO 95/01060 | 1/1995 |
| WO | WO 97/05555 | 2/1997 |
| WO | WO 97/23838 | 7/1997 |
| WO | WO 97/30410 | 8/1997 |

OTHER PUBLICATIONS

Levine et al., "The Internet for Dummies", *IDG Books Worldwide, Inc.*, 1993, pp. 7-9.

"FBM's Second Annual In-Store Challenge", *Food & Beverage Marketing*, vol. 14, No. 5, p. 38(7), May 1995, Dialog File 148, Accession No. 07895476.

Sheth et al., "Feeling the Heat—Part 1", *Marketing Management*, vol. 4, No. 2, pp. 8-23, Fall 1995, Dialog File 15, Accession No. 01103439.

(56) References Cited

OTHER PUBLICATIONS

Bank, "E-Mail Marketing Firm Using Discount Strategy", *San Jose Mercury News*, May 10, 1994, Dialog File 608, Accession No. 00208382.

"Windham Hill Spinning Internet Musical Tunes", *Bandweek*, vol. XXXVI, No. 8, Feb. 20, 1995, Dialog File 9, Accession No. 01129577.

Katcher, "Getting Products to Consumers", *Automotive Marketing*, vol. 19, No. 5, p. 34(3), May 1990, Dialog File 148, Accession No. 04591048.

Carr, "Beyond the Hype, There is Real Use for the Internet", *Sporting Goods Business*, vol. 29, No. 8, pp. 98, Aug. 1996, Dialog File 15, Accession No. 01283202.

"FreeMark Communications Announces Free, Online Couponing; Innovative Online Service Provider in Deal with Coupons Online; Campbell Soup Sings on", *Business Wire*, Nov. 6, 1995, Dialog File 16, Accession No. 05823622.

Savage, "The Bradenton Herald, Fla., Net Gains On-Line Column", *The Bradenton Herald*, Oct. 19, 1995, Dialog File 608, Accession No. 00303038.

*PR Newswire*, "USA: SLED Internet Directory Distributes Electronic Coupons", Reuters Info, Svcs., May 9, 1994.

"Trading Scissors for Modems", 2-page brochure, by Adrienne Ward Fawcett, *Advertising Age*, Jun. 5, 1995.

Moeller, Let's Hang Out at the E-Mall: eShop Opens its Doors to Tower Records, *PC Week*, vol. 12, No. 44, p. 75(1), Nov. 6, 1995.

Dworsky, "Consumer World Launched on the Internet", *M2 Presswire*, Sep. 26, 1995.

Porter, Arthur L., "Strengthening Coupon Offers by Requiring More from the Customer", *Journal of Consumer Marketing*, vol. 10, No. 2, pp. 13-18, 1993.

Shani, David, "Exploiting Niches Using Relationship Marketing" *Journal of Business and Industiral marketing*, vol. 8, No. 4, pp. 58-66, 1993.

"Online Targeted Coupon Delivery Offering Interactive Follow-Up and Analysis . . .", 2-page Brochure, *Coupons Online*, New Jersey, Electronic Marketing, Ltd., 1994.

"Coupons Online is a New Interactive, Targeted Online Distribution and Demographics Collection Method", 2-page Brochure, *Coupons Online*, New Jersey, Electronic Marketing, Ltd.

* cited by examiner

| EXPIRATION DATE | REDEMPTION AMOUNT | COMPANY AND PRODUCT DATA | UPC CODE | REDEMPTION ADDRESS | OFFER DESCRIPTION |
|---|---|---|---|---|---|
VARIABLE COUPON DATA FIELDS
| BORDER GRAPHICS | REDEMPTION INSTRUCTIONS | USER ID BAR CODE |
|---|---|---|
FIXED COUPON DATA FIELDS
FIG. 3
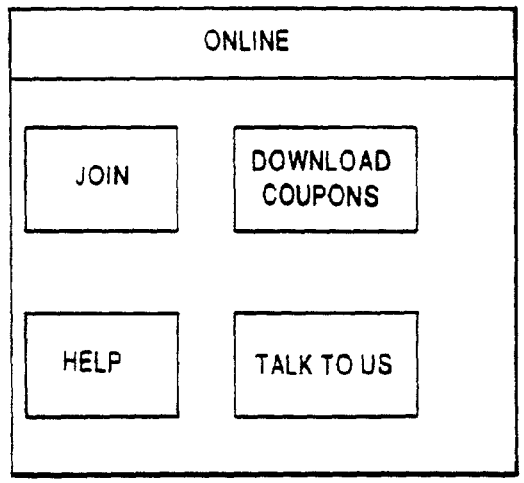
FIG. 4A
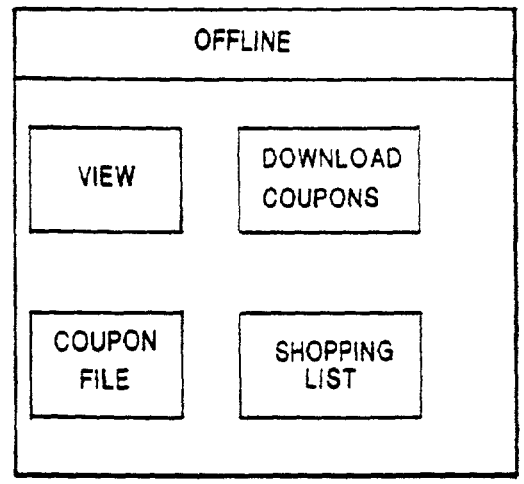
FIG. 4B

METHOD AND SYSTEM FOR ELECTRONIC DISTRIBUTION OF PRODUCT REDEMPTION COUPONS

This application is a continuation of U.S. patent application Ser. No. 08/425,185, filed Apr. 19, 1995, now U.S. Pat. No. 6,321,208, issued Nov. 20, 2001.

BACKGROUND OF THE INVENTION

The present invention relates to the electronic distribution of secure money saving or discount coupons and other marketing incentives and in particular to use of a centrally located online computer system for interactively distributing such coupons to remotely connected consumer computers and for collecting user-specific data regarding coupon usage and user demographic information from the remote computers.

Millions of consumers regularly use product redemption coupons and realize substantial savings as a result. Significant time is spent clipping and sorting coupons, discarding expired coupons and organizing current coupons for use on shopping trips. Conventional coupon distribution results in significant wasted time due to consumers' attempts to manage their coupon use.

Coupons are delivered to consumers through a variety of media. The primary coupon distribution is via pull-out sections in newspapers, which are known as free standing inserts (FSIs). This accounts for just over 80% of coupons used. Other methods of distribution include in-store shelf coupon dispensers, check-out coupons (generally issued based on the customer's current purchase), register receipt coupons, in-product coupons, instant peel-off on-product coupons and direct mail coupons. In addition to manufacturers' coupons, consumers use retail store coupons, such as those issued by large retail chains on a weekly basis.

Some consumers use coupons on a fairly random basis. These consumers tend not to keep coupons for future use, but will review coupons available just prior to shopping to see if any of them cover products they plan to buy or it there are any for new or improved products of interest.

More organized coupon users maintain some form of storage system to keep coupons for future use. These consumers often clip coupons regularly from all available sources, and often have coupon filing systems by product category. They will also review their coupons regularly, discarding unused coupons which have expired.

For most consumers, attempts to maintain an organized coupon file often fails. The "bother" and time required to maintain organized coupon files often results in neglect of those files, even though diligent shoppers know that a consistent significant savings is easily achievable using coupons.

The notion of issuing product redemption coupons to consumers was an innovative idea to entice consumers to try new products in the hope that, after the first try of a new product at a coupon discounted price, they would become repeat customers at the regular price. Coupons are effective tools used in launching new products. Manufacturers also find coupons can shore up flagging sales, help reduce excess inventory or win back consumers' brand loyalty, and so coupons for existing products have become customary, so much so that today's consumers have come to expect coupons. Often, coupon price incentives significantly reduce brand loyalty, and manufacturers must issue more coupons than desired to maintain market share. Market share has also been impacted by an increase in the number and variety of competing "no-name" store brands. The competitive nature of the retail industry does not allow manufacturers to reduce coupon distribution, and in some market sectors, such as cereals, the majority of purchases are made with coupons.

Consumers are most familiar with FSIs as a source for manufacturers' coupons. In 1993, the coupon redemption rate from FSIs was 2.3%, and gradually declining. The primary factors which keep the redemption rate low include consumers not needing or wanting the product advertised, consumers not bothering to clip coupons, losing clipped coupons or leaving them behind on shopping trips, lack of 100% distribution of newspapers, overcouponing within specific areas, and unavailability of new products when the coupon is issued.

Free standing inserts currently represents the largest share of the coupon distribution industry, roughly 80.2%. On average, manufacturers who use FSIs for coupon distribution, spend approximately $0.92 per coupon redeemed, which is the lowest redeemed cost per coupon redeemed when compared with other current coupon distribution methods. FSI coupon distribution results in high costs per coupon because of the shear complexity of and volume of materials involved in coupon distribution and redemption. Charges to manufacturers by FSI producers cover set-up, paper, printing, freight, newspaper insertion costs, sales and marketing, overhead and profit.

Direct mail coupons accounted for approximately 4.4% of coupon distribution in 1992. Direct mail coupons may be issued as part of a nationwide campaign or a regional campaign, may be cooperative or solo, and may be mass, zip-code/lifestyle/lifestage segmented or household targeted. Regional direct mail coupons are more common, and are usually limited to marketing the products and/or services of local vendors. Companies who practice database marketing make use of direct mail campaigns for delivering targeted incentives.

Run-of-Press ("ROP") Coupons accounted for 4.1% of the coupons distributed in 1992. These coupons consist primarily of stand alone newspaper advertisements with clip-out coupons. Often these advertisements are specifically placed to coincide with a relevant feature article. This form or coupon is marketed directly or through third party coupon issuers who have the nationwide newspaper distribution channels through which to place ROP coupons.

In/on pack coupons accounted for 3.5% of the coupons distributed in 1992. On pack coupons consist of an attached coupon which is removed and redeemed at the cash register at the time of purchase. In pack coupons are found within the product and act as an incentive to customers to repurchase the same product. It is estimated that the actual cost per in/on pack coupon redeemed is significantly less than that associated with other coupon distribution methods. Most on-pack coupons are redeemed as customers pay for their purchases. However, this also means that all items are sold at the coupon discount, lowering a manufacturer's overall revenues per product more so than other types of coupons.

In 1992, various other coupon distribution methods represented 5% of coupons distributed. Two important coupon distribution methods in this category include shelf distribution and custom prepared coupon distribution. Thousands of stores use coupon dispensers which are attached to a product's shelf. Customers can pull out one coupon from the dispenser for the product advertised. This method of coupon distribution is designed to reach the consumer at the point of making a purchase decision, and has a redemption rate of approximately 18%.

Check-out coupons are printed at the check-out by a printer installed at the cash register. A computer analyzes the purchases made by each customer, and can print competitor's coupons or other coupons related to items in the current purchase. This system has a coupon redemption rate of approximately 9%.

The coupon industry expends a great deal of resources in market research, printing, issuing, distributing and redeeming coupons, yet produces an extremely low redemption rate. This is attributed to the haphazard systems used by most consumers of manually clipping, filing, sorting through, and ultimately using the coupons, and to the high cost associated with targeting coupons to each consumer.

Attempts have been made in the prior art to meet the needs of the coupon industry and the consumer. U.S. Pat. No. 5,249,044 to Von Kohorn describes a television-based coupon reception system wherein coupon information is transmitted along with program information to a broadcast audience. A member of the audience can generate a coupon for subsequent redemption at a store.

U.S. Pat. No. 5,285,278 and 5,287,181 to Holman also teach a television-based coupon reception system. Coupon information is encoded into a television broadcast signal and decoded at the consumer's television by circuitry similar to that used for closed-caption broadcast decoding. The extracted coupon information is then recorded on a medium such as a magnetic stripe card or a microprocessor-based "smart card". The user can then present the medium at the supermarket in order to automatically receive the appropriate discount U.S. Pat. No. 5,185,695 to Pruchniki discloses an electronic paperless coupon system which obviates the need for a paper coupon in order to save printing, processing and clearinghouse costs as well as eliminating counterfeiting. Coupon redemption information is transmitted from a central system to local retailers, where coupon signs are placed near the related item. The discount is automatically applied at the point of sale without the need for the consumer to present a paper coupon.

U.S. Pat. No. 5,176,224 to Spector teaches a closed-loop coupon system which consists of a kiosk type printer station located at a retail store. The kiosk is linked to the manufacturer(s) in order to obtain specific coupon information. The consumer selects the desired coupon at the kiosk, and the coupon is printed and dispensed. The consumer presents the coupon at the register, where the discount is applied and the discount transaction data is transmitted back to the manufacturer.

U.S. Pat. No. 4,674,041 to Lemon et al. discloses a system with remotely located coupon printing stations capable of limiting the number of coupons printed in a given time period. Each coupon station has a display for indicating the available coupons, selection means to allow the consumer to choose the desired coupon, and a coupon printer. The system disables display of a particular coupon when a preselected coupon limit has been reached.

While these aforementioned prior art attempts at providing couponing systems are useful in their own right, they fail to provide for a secure and interactive coupon generation system in which the user can request, select, store, manipulate and print coupons as desired, in which user-specific information such as demographic data and data representative of those coupons so requested, selected, printed and actually used may be provided back to the coupon issuer and distributor for more efficient coupon targeting in subsequent coupon issuance and distribution.

It is therefore an object of the present invention to provide such a coupon distribution system which overcomes the aforementioned problems and shortcomings of the prior art.

It is an object of the present invention to provide an electronic coupon distribution system which can be easily accessed by masses of consumers by using a readily available personal computer rather than needing to purchase special-purpose equipment.

It is a further object of the present invention to provide such an electronic coupon distribution system which allows a user to request transmission of coupon data and select, store, manipulate and print coupons from such coupon data.

It is a further object of the present invention to provide such an electronic coupon distribution system which allows the coupon issuing companies to access valuable information directly from the consumer without requiring specific and additional action by the consumer but rather by using the information from the user's personal computer regarding the consumer's selection, printing and actual redemption of coupons, as well as responses to demographic queries posed to the users.

It is a further object of the present invention to provide such an electronic coupon distribution system which allows a consumer to generate shopping lists associated with coupons selected and printed, in order to simplify the shopping process and promote the use of product coupons.

It is a further object of the present invention to provide such an electronic coupon distribution system which allows for automatic deletion of expired coupons in the user's computer database and the modification of redemption amounts of coupons in the user's database, both of which can be transparent to the user.

It is a still further object of the present invention to provide a secure coupon system which generates unique coupons with user-identifying data and allows the printing of a coupon only once, thus eliminating the possibility of fraud by both the consumer and the retailer.

It is a still further object of the invention to provide an efficient, low cost, zip-code/lifestyle/lifestage or household targeted coupon distribution system to tailor the incentives to each user.

SUMMARY OF THE INVENTION

In accordance with these and other objects, provided is a system for distributing and generating at a remote site product redemption coupons comprising a centrally located repository of electronically stored product redemption coupon data, transmission means operatively associated with said centrally located repository for providing data communication between said repository and a plurality of remote user computers, and a remote user computer operatively associated with said transmission means. The remote user computer in the present invention comprises interface means for providing user interaction with the centrally located repository, a memory, and a coupon data management program. The coupon data management program is implemented by the computer for requesting coupon data from the centrally located repository, for storing in the memory coupon data transmitted from the centrally located repository, and for generating printable coupon data from the stored coupon data. The remote user computer also comprises a coupon output buffer operatively associated with the data management program for storing the printable coupon data generated by said coupon data management program.

The present invention additionally comprises a printer for printing product redemption coupons from the printable coupon data stored in the coupon output buffer. Alternatively, the system may enable the user to transmit electronically the printable coupon data from the coupon output buffer to the centrally located repository or directly to the retailer for electronic coupon redemption.

As a result of the present invention, a user of the remote computer is able to request coupon data to be transmitted from said centrally located repository, and the user is able to instruct his computer to print or electronically transfer product redemption coupons generated from the transmitted coupon data. In particular, the user's computer assembles product redemption coupons for printing by using two data components; (1) fixed coupon data which is transmitted to the user's computer during an initialization or "sign-up" process and which remains stored on the user's computer for subsequent coupon generation, and (2) variable coupon data which is transmitted to the user's computer whenever he requests coupon data from the central repository.

Additionally, the coupon data management program of the present invention operates in conjunction with the remote computer to allow the user to select and store certain desired coupon data from the coupon data transmitted by the centrally located repository and print coupons as selected. The coupon data management program also allows the user to generate a shopping list which is correlated to the coupons printed for subsequent redemption.

In the present invention, the data exchange capabilities provided by the transmission medium between the remote computer and the central repository allow the automatic transfer of valuable information from the remote computer to the central repository and, ultimately, to the coupon distributing and issuing centers. Information related to the coupons selected and printed can be supplied to the coupon distributors and issuers, which can also use information obtained from the various retail stores as to which coupons were actually redeemed in order to more intelligently market subsequent coupons and target coupon issuance in a more cost effective manner.

The data exchange capabilities are further advantageously utilized in the present invention to allow, via the central repository, the updating of coupon data stored in the user's remote computer without required interaction from the user if the user is online. In particular, the central repository can delete expired coupons from the remote computer's coupon database and can vary the amount of redemption value of a non-expired coupon if so desired. The capability for the updating and deleting of coupons within a user's computer is programmed in the user's computer such that no further interaction with the central repository is required for such coupons to be deleted or updated.

Finally, the present invention provides for secure coupon generation by allowing the printing of a particular coupon only once. Further, and quite importantly, the present invention provides for the printing on each coupon of certain user-specific data, thus making each coupon printed unique. Thus, two different users with access to printing a particular coupon will each print coupons with the same product, discount, and expiration date data, yet each will be unique since printed thereon will be user-specific data, preferably in the form of a user-specific bar code. Thus, any attempts to duplicate via photocopying techniques any particular coupon will be discouraged since the coupon redemption center will detect when a particular coupon has been redeemed, will identify the user who redeems a particular coupon, and will disallow any attempt at redemption of a second coupon with identical product and user-specific data.

BRIEF DESCRIPTION OF THE DRAWING

FIG. 3 illustrates exemplary data field formats of the electronic coupon data as implemented in the present invention.

FIGS. 4a and 4b is a pictorial representations of the online and offline display screens, respectively, which are exhibited to a user in the present invention.

DETAILED DESCRIPTION OF THE PREFERRED EMBODIMENT

Figure 1:
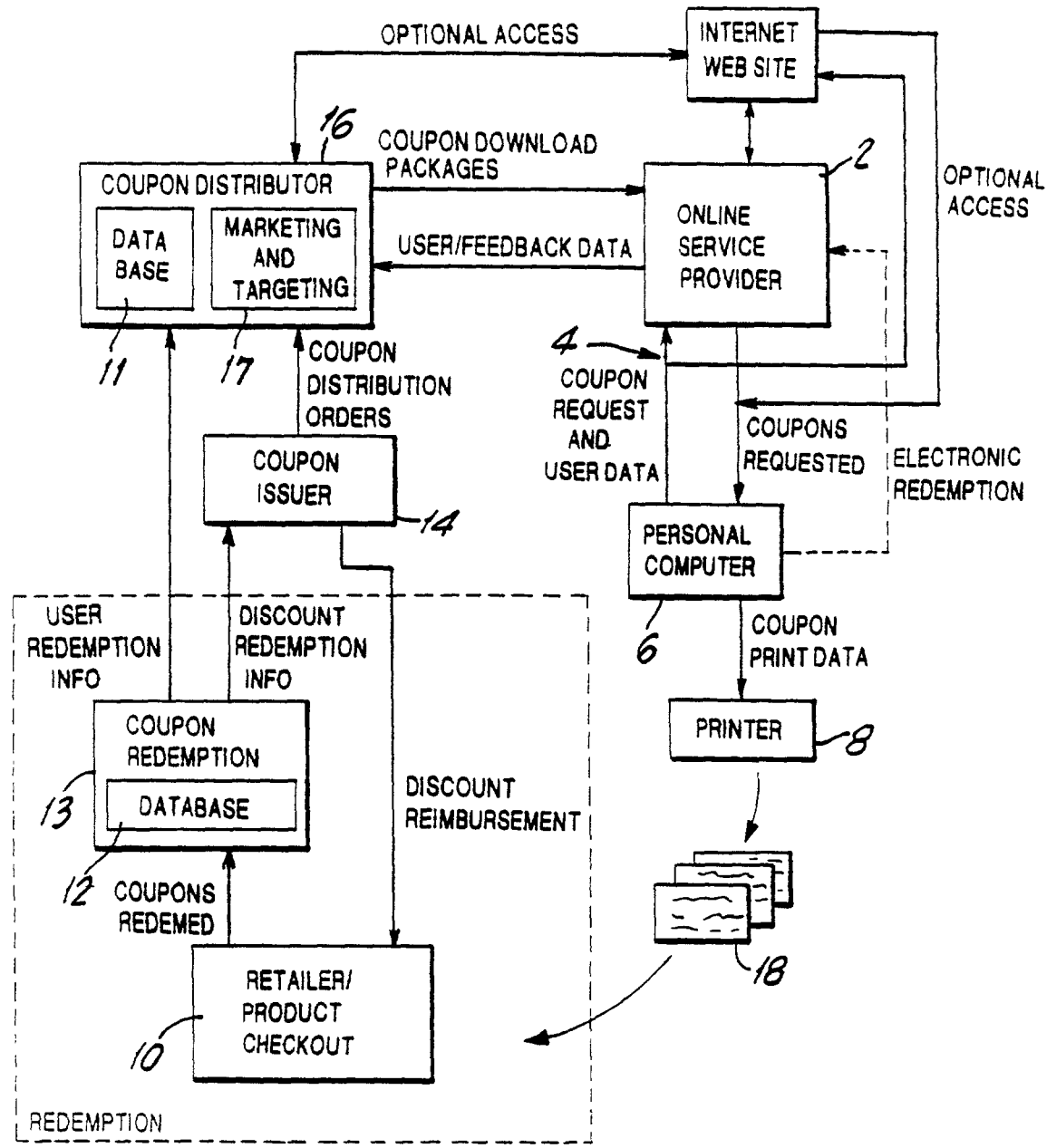
FIG. 1 is a block diagram schematic of the system of the preferred embodiment for the electronic distribution of coupons.
Figure 8:
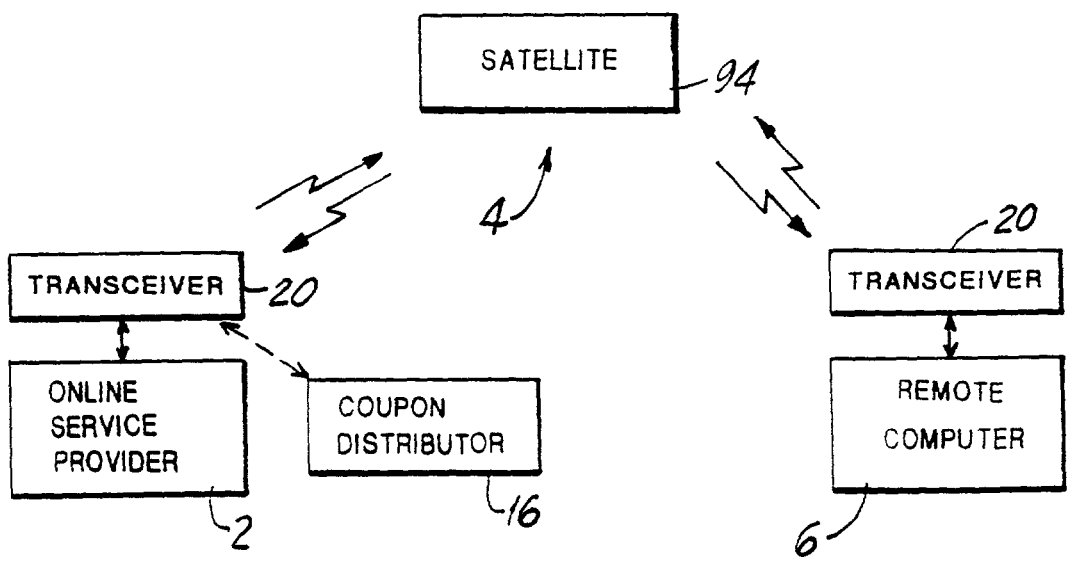
FIG. 8 is a block diagram of an alternative embodiment of the present invention in which data is transmitted between the central repository and personal computer by satellite.
Figure 9:
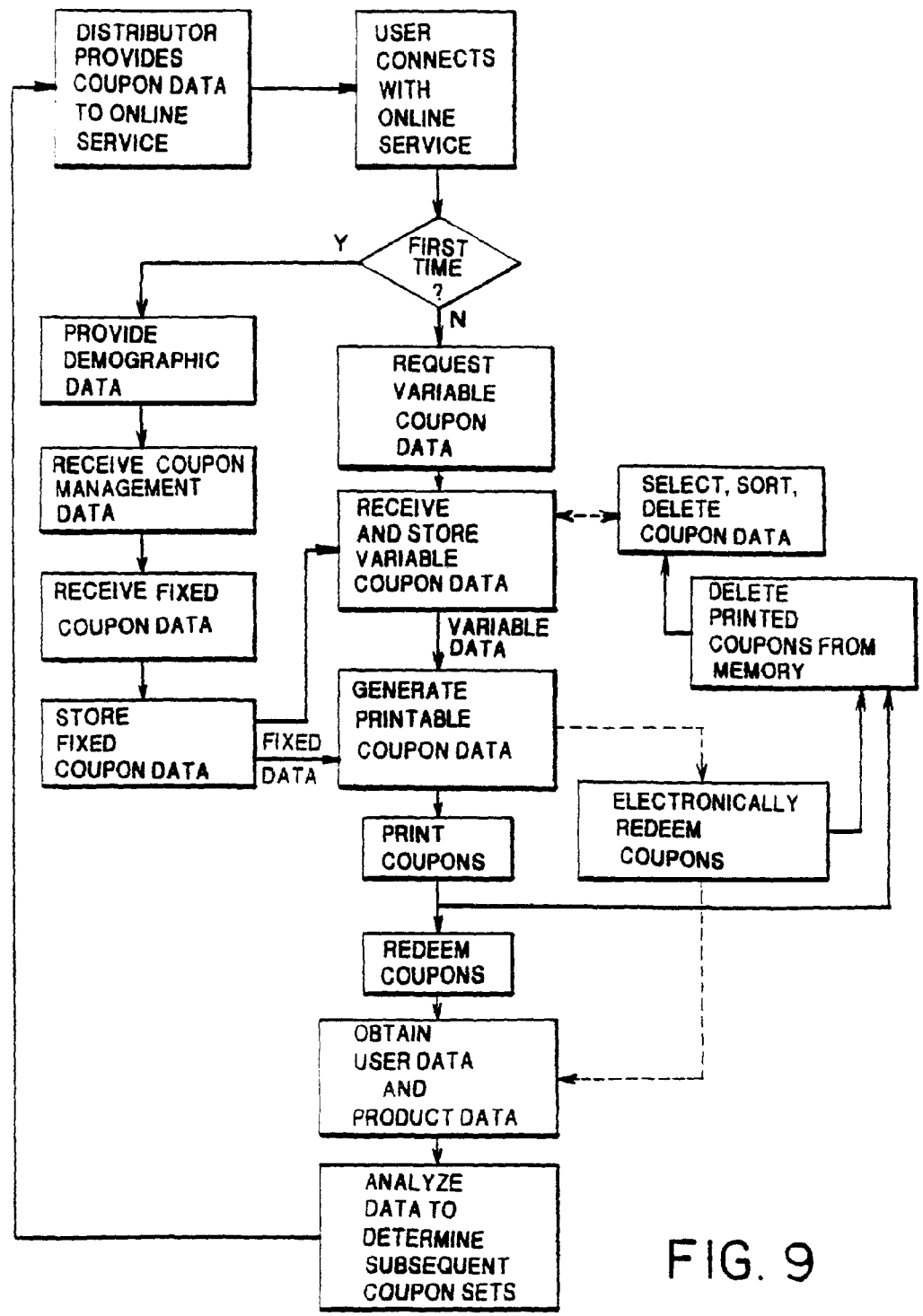
FIG. 9 is a flowchart of the operation of the present invention.

Referring to the system block diagram of FIG. 1 and the flowchart of FIG. 9, the electronic coupon distribution system of the preferred embodiment comprises a central located repository of electronically stored coupon data, which in the preferred embodiment is an online service provider 2. The term online service provider refers herein to any computer-based information service provider which is accessible by a remote personal computer user via a communications data link such as the public switched telephone network (PSTN) or the like, such as PRODIGY, COMPUSERVE, or AMERICA ONLINE. In addition, it is contemplated that the electronic coupon data distribution may be carried out by connection to any readily accessible Internet site such as the World Wide Web. Referring to FIG. 8, it is further contemplated that electronic coupon distribution may also be carried out via digital satellite communication links, thus avoiding the need for hardwired (i.e. PSTN) connectivity between the repository and the remote user computer. Thus, any centrally located computer system which is accessible to the public by any transmission means is contemplated as being within the scope of this invention. As used herein, the term "user" denotes an individual user or a household of users linked through one account.

The online service provider has stored in its database 40 (see FIGS. 6 and 10) various packages of electronic coupon data, the content of which will be further described below. The electronic coupon data is provided, by a coupon distributor 16 or coupon issuer 14, by any of various means such as electronic transmission via the PSTN or satellite data exchange. The online service provider also stores in a demographic data file 42 user-specific data, including coupons selected data, coupons deleted data, coupons printed data and user demographics, as will be described below, for subsequent transmission to a coupon distributor 16. The coupon distributor 16 will utilize the user-specific data and coupon redemption data in compiling subsequent coupon packages targeted specifically at certain user categories.

Figure 2:
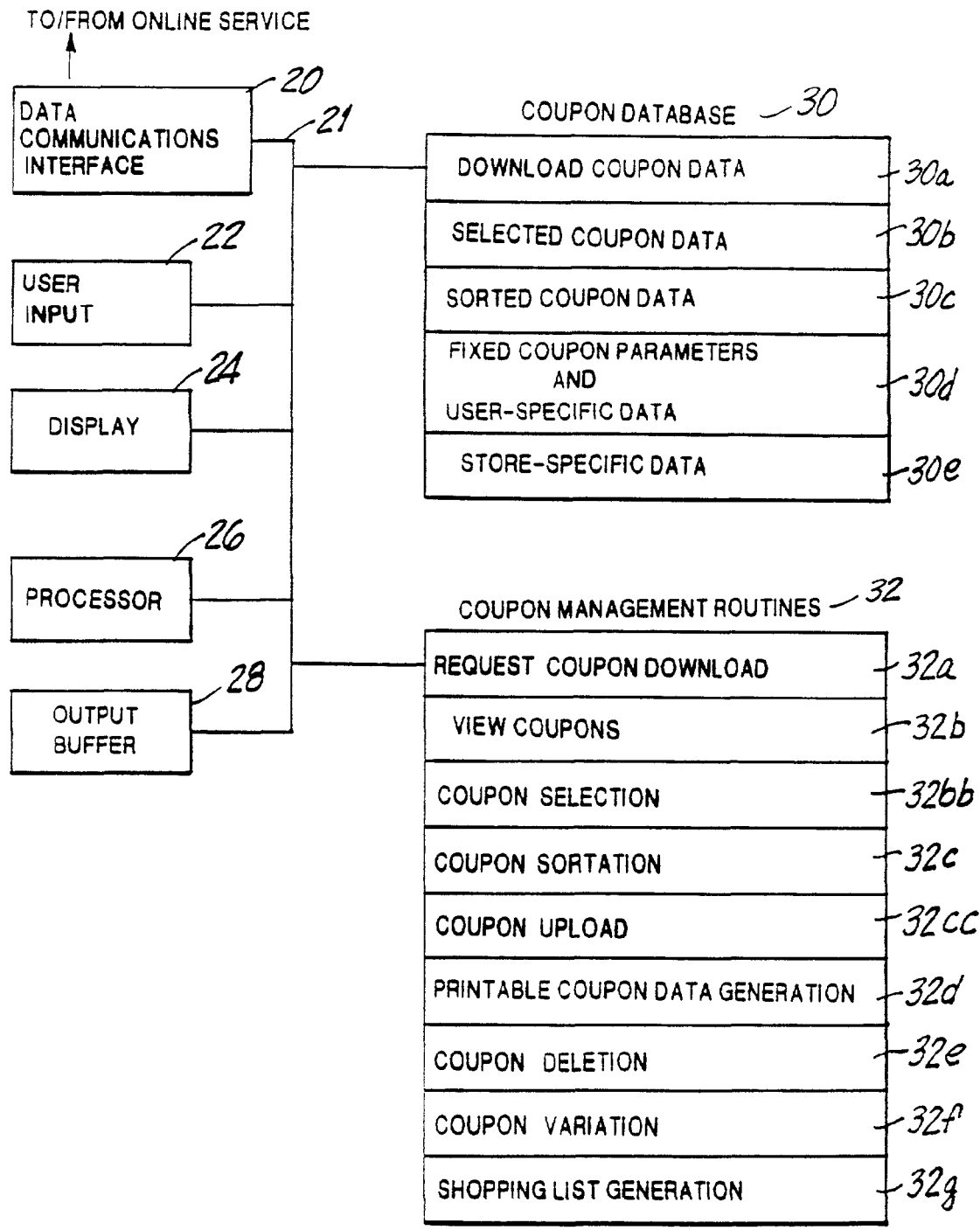
FIG. 2 is a detailed block diagram of the remote personal computer of FIG. 1 configured in accordance with the present invention.

The online service provider 2 is connected with the data link 4 and is thus accessible by any remote personal computer 6 having a data communications interface 20 such as a modem (see FIG. 2). The online service provider communicates with the personal computer 6 in order to transmit requested coupon data, and also in order to receive coupon requests and the user-specific data mentioned above.

The remote personal computer 6 has connected thereto a printer 8, which may be any type of computer printer capable of printing graphics. The printer 8 is instructed by the coupon data management routines 32 stored in the computer 6 in order to print printed coupons 18, as will be described in detail below.

The printed coupons 18 are used in the normal fashion by a consumer when shopping at a desired retail store 10. That is, the coupons 18 are presented to a product checkout station 11 along with the associated products for purchase, and the discount amount shown on the coupon 18 is credited to the consumer at the point of sale. The redeemed coupons 18 are transmitted to a coupon redemption center 13 where they are electronically read, and user-specific data is stored in a coupon redemption database 12.

Figure 5:
FIG. 5 is a diagram of a printed coupon resulting from the electronic distribution in accordance with the present invention.

In addition to the usual coupon information found in prior art coupons (e.g. redemption amount, company and product name, expiration date, etc.), the coupons 18 of the preferred embodiment of the present invention contain user-specific data in the form of a unique user bar code 90, as shown graphically in FIG. 5. The user bar code 90 is encoded with user-specific information such as the user name and/or other unique identification criteria such as a social security number or online service address. This information renders each printed coupon 18 unique, since an otherwise similar coupon presented by a different consumer will comprise a different user bar code 90. The use of a unique coupon 18 is but one aspect of the secure nature of the present invention as will be described in detail below.

The coupon redemption center 13 receives from a number of stores 10 the coupons redeemed, verifies the value of the redeemed coupons, determines the identification of users who redeemed the coupons, and distributes the information read from the coupons 18 to the individual coupon issuer 14 and to the coupon distributor 16. In particular, information regarding the redemption amount and the redeeming store 10 is forwarded to the particular coupon issuer 14 named on the coupon 18, which then credits the redeeming store 10 with the total amount of discounts given. Of particular value in the present invention is the distribution of user-specific data to the coupon distribution center 16, which collates such user information and performs marketing analysis via a marketing analysis means 17 in order to compile subsequent coupon packages targeted specifically at certain user categories. The coupon distribution center 16 utilizes the user-specific redemption data along with user-specific demographic data supplied by the online service provider 2 in order to compile subsequent coupon data download packages for use by consumers once again.

An online display screen 60 is shown in FIG. 4a, which is provided to a user on a display 24 of his remote computer 6 whenever he is in online communication with the service provider 2. The online display screen 60 comprises a join service function button 62, a download coupons function button 64, a help function button 66, and an online communications button 68. When the user desires to initially register for the electronic coupon distribution service, he selects the join service function button 62 which initiates a dialog with the online service provider 2 in order to request certain demographic data from the user which will be used to target specific coupon data packages for subsequent downloading. The user has the option of providing the requested information if he so desires. In addition, an offline coupon management program is transmitted electronically to the user's computer 6 for subsequent coupon data requesting, downloading and processing.

Figure 6:
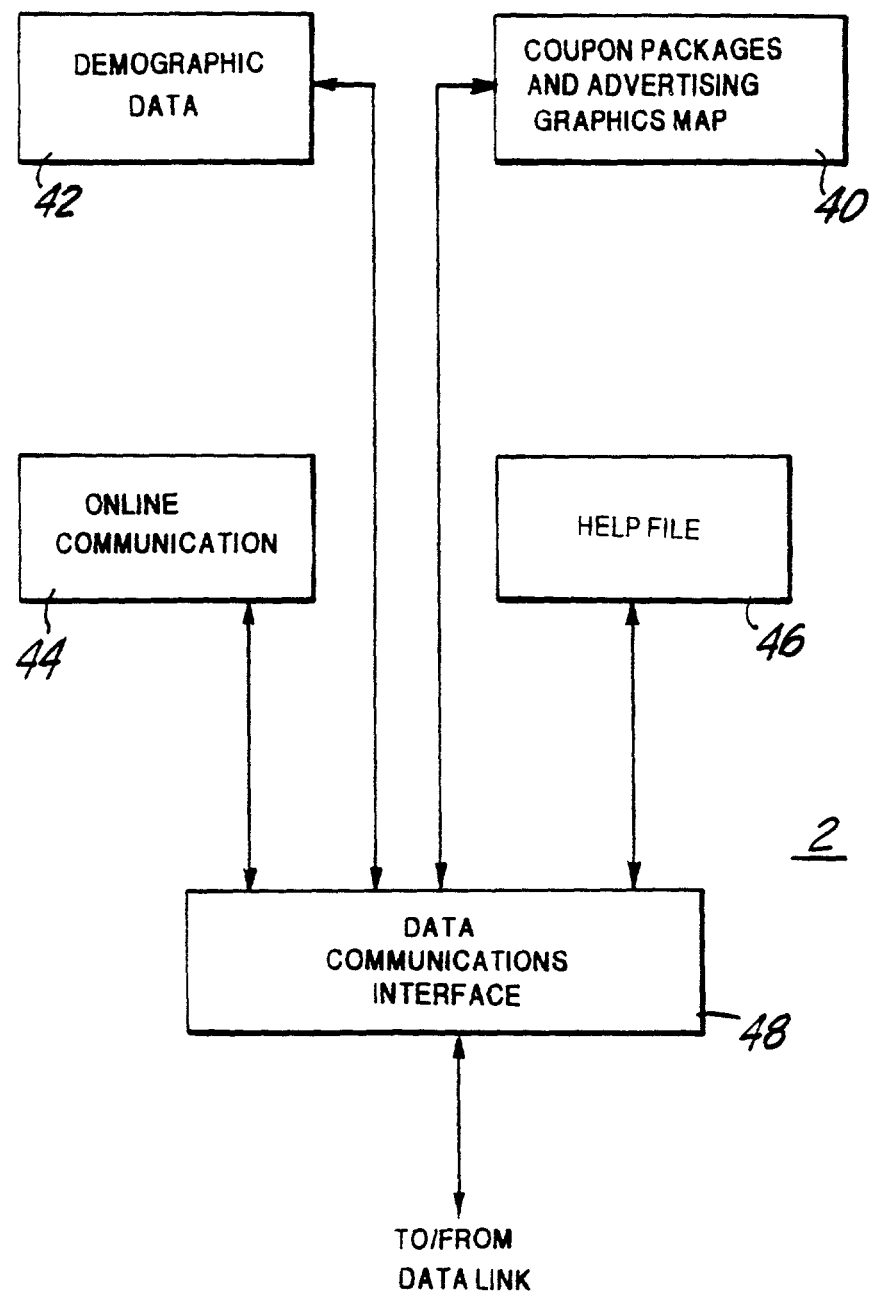
FIG. 6 is a schematic block diagram illustrating the main functional areas serviced by the online service provider of the preferred embodiment system.

FIG. 6 illustrates the functional aspects of the online service provider 2 in the preferred embodiment of the present invention. The main features provided by the online service provider 2 are the coupon packages file 40, the demographic data file 42, the online communications server 44, and the help file 46. Each of the aforementioned features communicates with the user via the data communications interface 48.

The coupon packages file 40 comprises electronic coupon data and other types of advertising materials supplied by the various coupon issuers 14 through the coupon distributor 16. Individual users' coupon data packages are drawn from this file based on demographic data and historic buying profiles stored in the demographic data file 42. Advertisements may consist of graphics, text, recipes, competitions or other inducements or a combination thereof.

After joining the electronic coupon service, the user can order a package of electronic coupons from the online service provider 2 by selecting the download coupon function button 64. When this button is selected, commands are generated and transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

The demographic data file 42 contains data representative of demographic inquiries presented to a user at the time that the user requests a download of coupon data from the coupon package data file 40, as well as data representative of the users' responses thereto.

The online communication server 44 is accessed by the user selecting the online communication button 68. The online communication server is a bulletin board type file where users can post messages to a coupon distributor or issuer regarding any issue of interest. The message data is transferred to the appropriate destination by the online service provider 2, which also collects the responses thereto and posts them on the online communication server 44, thus allowing the user to fetch the response when logged on at a subsequent time.

By selecting the help function button 66, the help file 46 is used as a means for providing standard help and other useful information to a user.

Referring to FIG. 2, the remote personal computer 6 of the preferred embodiment comprises a data communications interface 20 (such as a modem) for connecting the computer to the data link 4 (such as a PSTN), a user input device 22 such as a keyboard and mouse or other type pointing device, a display 24, and a processor 26, all of which are common to personal computers and are well known in the art. The computer 6 also comprises an output buffer 28, which typically resides in random access memory. The computer 6 is configured to operate in accordance with the present invention via a coupon database file 30 and an offline coupon data management routine file 32 loaded onto a fixed memory such as a hard disk drive. All of these internal components and files are connected to a data bus 21 for communication therebetween in accordance with techniques well known in the art.

The coupon database file 30 is segmented into various sections as shown in the memory map of FIG. 2. The coupon database of the preferred embodiment comprises downloaded coupon data 30a, which is the entire coupon data package downloaded from the online service provider 2; selected coupon data 30b, which is a subset of the downloaded data and represents specific coupons electronically "clipped" and stored therein; sorted coupon data 30c, which is selected coupon data sorted in accordance with a particular set of criteria (e.g. all fruits together, then all dairy products, etc.); fixed coupon parameters and user-specific data 30d, which is certain unvarying data used in printing the coupons as will be described in detail below; and store-specific data 30e, which is information regarding the product arrangement in a certain retail store 10 which will allow the user to prepare a shopping list tailored to the particular store.

The offline coupon data management routines 32 are executed by the processor 26 in conjunction with the coupon database 30 in order to request, obtain, store, select, sort, and print coupons as desired. The offline coupon data management routines 32 are executed by selecting a desired function button 52, 54, 56, or 58 as shown in the offline display screen 50 in FIG. 4b. The offline display screen 50 is shown on the display 24 when the user runs the coupon data management program on his or her personal computer 6. The offline coupon data management routines 32 are executed in an offline fashion; that is, the user does not need to first be in online communication with the service provider 2. If a particular function button 52, 54, 56, or 58 chosen by the user initiates a routine 32 which requires online communication, that routine will initiate, control and terminate an online session with the service provider 2 automatically.

The request coupon download routine 32a is executed when the user desires to order a package of electronic coupons from the online service provider 2. This routine is called when the user selects the download coupon function button 54. When this routine is called, commands generated by this routine are transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

Prior to downloading the requested coupon data package to the computer 6, the demographic data file 42 provides certain demographic queries to the user in order to obtain valuable information for use in marketing analysis and subsequent coupon package generation. The users' responses to the queries are transmitted to the online service provider 2 and stored in the demographic data file 42 for subsequent processing.

The user may select the view function button 52 in order to view the coupons and advertisements previously downloaded. This selection will call the view coupons routine 32b, which will access the downloaded coupon data file 30a and present it to the user via the display 24.

While viewing the coupons and advertisement, the user may select a desired coupon for further sorting, storage, printing or deleting and/or shopping list generation by selecting or "clipping" the coupon with the mouse or keyboard input 22. Coupons are clipped by scrolling through related advertisements. In order to avoid the need for clipping, the user may print or delete a desired coupon. The coupons selected in this function are stored for further processing in the selected coupon data file 30b.

The coupon file function button 56 enables the user to perform several operations on his selected coupon data file 30b. The user may view the coupons selected (from the selected coupon data file 30b), and may choose any of them for printing. Further, a sortation option is provided which logically sorts, by category and subcategory, the coupons stored. Thus, the management program automatically places all the dairy coupons together, and may also place all the milk coupons together within the dairy category. This is carried out by the coupon sortation routine 32c, and is akin to the manual filing system used in the prior art and will aid the user in viewing his selected but unprinted coupons in an efficient manner. The sorted coupons may be loaded into the sorted coupon data file 30c for subsequent viewing and printing. The user may optionally sort the coupons manually by his own classification.

The shopping list function button 58 calls the shopping list generation routine 32g when selected by the user. This routine will allow the user to generate a list from a menu presented on the screen whichever items the user desires to purchase, and the user can store and/or print this list as desired. The items on the list are compared against coupon data stored in the coupon database 30 and the user is informed of their existence. The user may then print out those coupons along with the shopping list. Alternatively, the user may select certain coupons for printing, and the item associated therewith is automatically placed on the shopping list. Thus, in either fashion, the user's shopping list generation and coupon "clipping" tasks are conveniently merged in a timesaving manner.

The shopping list generation routine 32g may also advantageously use data stored in the store-specific data file 30e in order to prepare a shopping list tailored to an individual retail store. Thus, data regarding the layout of the store, the food items available at the store, and the like, are used by the list generation routine 32g in order to organize the purchase items accordingly. The data stored in the store-specific data file 30e may be obtained by any of several methods; by downloading from the online service provider 2, by inputting via a floppy disk memory supplied by the store, or even manually input by the user. Data for different stores can be kept in the file 30e and the user simply selects the store he intends on using at that particular time. The user may select a standard preprogrammed shopping list, his last generated shopping list, or a blank shopping list from which to commence his shopping list preparation.

The coupon upload routine 32cc is called automatically and without user request whenever the user requests a coupon download package from the online service provider 2. A record is kept by the upload routine 32cc indicative of each coupon selected by the user and each coupon printed by the user. This record is sent to the demographic data file 42 in the online service provider 2, and is used for marketing analysis along with data regarding which coupons were actually redeemed, which information is obtained from the manufacturers' redemption agency or center.

Coupons are printed by the printable coupon data generation routine 32d, which is invoked by a user when he selects a print command from the coupon file function 56. This routine obtains data from two sources in the coupon database 30: the fixed coupon parameters and user-specific data file 30d, and the variable coupon data associated with the particular coupon selected for printing.

Referring to FIG. 3, the data format of the fixed coupon parameters and user-specific data are set forth and include predefined border graphics which are the same for every coupon printed, redemption instructions, and a user identification bar code number. The user identification bar code number is a unique number assigned to that user, e.g. his social security number or online identification number. This number will be encoded by the printable coupon data generation routine 32d and printed as a bar code 90 on each coupon 18 printed for the particular user. This information will thus be obtained by the coupon redemption center and provided to the coupon distributor 16 for demographic analysis and the like.

The unique user bar code 90 also renders the electronic coupon system of the present invention secure and virtually fraud-proof. Although a user is able to print out a particular coupon 18 only once (to be described in detail below), the coupon issuer 14 could still be defrauded by a user or retailer who might photocopy a printed coupon numerous times and fraudulently and repeatedly present it for redemption. However, in accordance with the present invention, each coupon printed by a user is unique, and the scanning of a coupon presented for redemption will be stored at the coupon redemption center. Thus, the coupon issuer will know if a particular user has redeemed a particular coupon and thus disallow further redemption of a photocopied coupon bearing the same indicia.

Referring again to FIG. 3, the data format of the variable coupon parameters are set forth and include the coupon expiration date, the redemption amount, the company and product information, the UPC code, the redemption address, and the description of the coupon offer.

Thus, the printable coupon data generation routine 32*d* combines all this information and generates a record indicative of the unique coupon to be printed. This record is temporarily stored in the output buffer 28, where it is subsequently sent to the printer 8 for printing. In the alternative, the coupon may be redeemed electronically by sending the coupon data in the output buffer via the data communications interface 20 back to the online service provider 2. This is especially useful in the "electronic shopping mall" environment now found in many online services. The electronic coupon data could also be routed via the data communications interface 20 to a retail store where the user will be shopping, where the coupon data is held in a buffer pending purchase by the user of the matching product.

As described above, the electronic coupon distribution system of the present invention allows the printing of a particular coupon only once, thus providing for security and guarding against fraudulent redemption. This is accomplished by the coupon deletion routine 32*e*, which is called whenever a coupon is printed and deletes the coupon from the database 30 or renders it unprintable by setting an appropriate flag. In addition, the coupon deletion routine 32*e* allows for automatic deletion of expired coupons by periodically checking the expiration date field of each coupon against a real-time clock found in the computer 6. Optionally, the user may voluntarily delete any coupon which is expired if the real-time clock is not set to the correct date. For the user's convenience, the online service provider 2 can check the system clock of the user's computer 6 during a communications session and, if the date is incorrect, can ask the user if he would like the date adjusted automatically.

Since the actual expiration date is always printed as part of the coupon, the function of deleting expired coupon data from the user's computer 6 is for the convenience of the user rather than for security purposes.

The system of the present invention also allows for time-sensitive deletion of certain coupon data from the user computer 6 which is unrelated to the expiration date. That is, certain coupon data may be automatically deleted from the user's computer after, e.g., one month, notwithstanding that the coupon, if printed, might have an expiration date in six months. This feature is included to prompt users who know of the time-sensitive autodeletion to promptly print (and use) coupons rather than risk having them deleted from their database.

The coupon management program also can vary the redemption value of any coupon already downloaded to the user's computer 6 without the need for specific user interaction. A coupon variation routine 32*f* is called which aids in this task. Again, any time that a-user initiates a download of coupon data, the on-line service provider 2 can update redemption amounts for coupons whose issuers have decided to change the discount amount.

Referring to FIG. 5, the secure coupon 70 generated and printed in the preferred embodiment is illustrated in detail. The secure coupon 70 comprises the following fixed components taken from the fixed coupon parameter and user-specific data file 30*d*: border graphics 72, redemption instructions 88, and user identification bar code 90. The secure coupon 70 also comprises the following variable components which change for each coupon selected: expiration date 78, redemption amount 74, description of the offer 76, company and/or product information 80, the item's UPC number 82 and the associated UPC bar code 84, and the redemption address 86.

Figure 10:
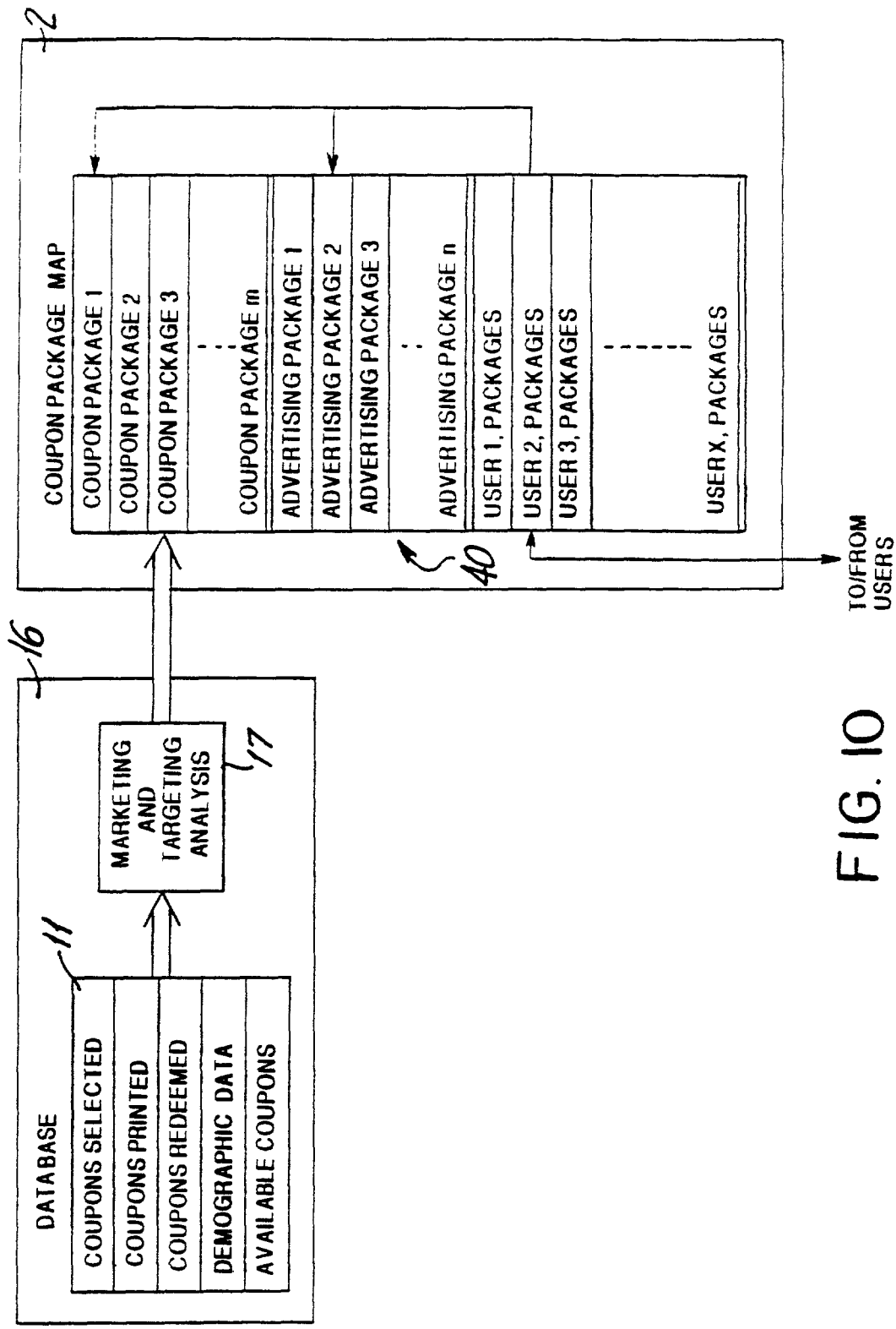
FIG. 10 is a schematic block diagram of the implementation of the coupon data package generation.

Referring to FIG. 10, the generation of coupon data packages by the coupon distributor 16 will be explained. The information collected by the coupon distributor 16 from the online service provider 2 regarding the coupon data selected by the user, the coupon data printed by the user, and the requested demographic information is stored in a database 11. The database 11 also stores information from the coupon redemption center 13 regarding the coupons actually redeemed by the user. The database 11 further stores information regarding all coupons which are made available by the various coupon issuers 14 from which it will generate coupon data packages for subsequent downloading to users.

The information stored in the database 11 is input to the marketing and targeting analysis means 17, which carries out the function of analyzing the aforementioned information in a manner known in the art to arrive at different coupon packages. That is, it may be determined by the analysis means 17 that users with dogs in their household (which is known by the demographic responses) will get a certain package comprising dog food coupons. It may be further determined that users who select, print and redeem dog food coupons of Brand X will get coupons issued by Brand Y, or will get only low value coupons since they are already dog food coupon users, etc. That is, depending on the marketing and targeting criteria and objectives, the analysis means will generate coupon packages as desired.

Thus, the analysis means generates a number of differing coupon data packages for transmittal to the online service provider 2. The analysis means also provides specific mapping information which will instruct the online service provider as to which user should be provided with which package(s). For example, user 1 may be mapped to coupon data packages 2 and 3; user no. 2 to packages 3 and 6, etc. This mapping function may be carried out by the coupon distributor and provided to the online service provider at regular intervals, e.g. once per week. Thus, the coupon selection, printing and redemption habits may be analyzed over a time period and used to determine the subsequent targeted packages.

In addition to mapping certain coupon data packages to certain users, certain advertising packages may be mapped to the users in a similar fashion.

In accordance with the present invention, the marketing analysis, coupon packaging, and coupon package distribution functions carried out by the coupon distributor 16 may be carried out at the central data repository, i.e. Internet web site. Further, the coupon redemption and user redemption information processing functions individually carried out by the coupon redemption center 13 and the individual retail stores 10 may be combined into a single redemption center, as shown by the dotted line in FIG. 1. The physical layout of the functions within the system of the present invention is a matter a practicality and choice of the systems designer and does not impact the utility of the present invention.

Figure 7:
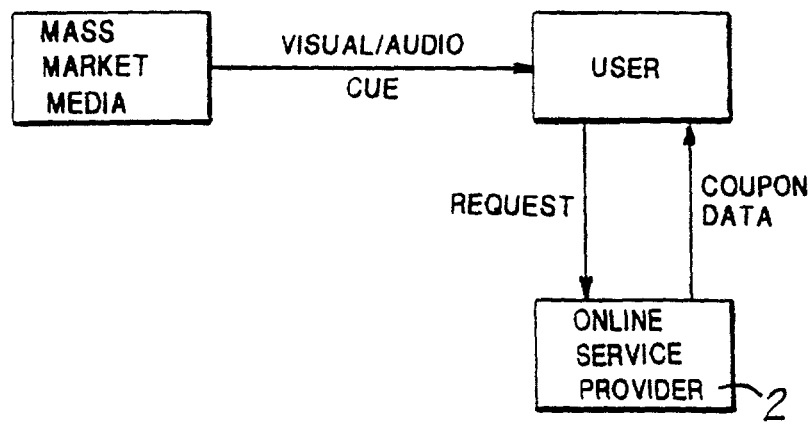
FIG. 7 is a diagram of the use of an external cue to prompt access by the user of the system.

In an alternative embodiment of the present invention, the user is provided with a visual or auditory stimulus or cue to suggest an access of the electronic coupon distribution system. Referring to FIG. 7, a message or logo may be included along with the advertising material normally provided on television, in the newspapers, and the like. This will indicate to a user that he should access the online service provider 2 in order to obtain coupon data related to the advertised product. The availability of the coupon could be time-sensitive, which would provide further incentive to the user to use the system in a prompt and efficient manner. When the radio media is used, a tonal or spoken cue may be included during the advertising message to accomplish the same result.

The amount of redemption discount included with a coupon downloaded to a user may be varied depending on certain demographic information that the system has about the user. For instance, the system may provide a certain value for known users of a brand (which information it will obtain by demographic inquiry or through previous redemptions in the system), and it may provider a higher discount in order to provide an incentive to users of a competitive brand. The ability to vary the value of a discount offer in accordance with such demographic and usage data is a unique advantage offered by the system of the present invention and heretofore unavailable in the prior art.

Referring to FIG. 8, an alternative means of communication between the online service provider 2 or the coupon distributor 16 and the remote computer 6 is illustrated. A satellite communications apparatus 94 is advantageously used to provide a wireless data link 4. In this embodiment, the data communications interface 20 is a satellite antenna dish or other transceiver unit which provides operative communication between the remote computer 6 and the satellite 94. A similar unit is located at the online service provider 2 in order for full wireless data communications to be achieved.

The flowchart of FIG. 9 illustrates the flow of information in the system of the present invention. The information flow illustrated therein has been described in detail in connection with the implementing system.

In a further alternative embodiment of the present invention, the functions of the online service provider 2 are carried out at a site on the Internet. That is, a user may access the coupon data repository by accessing an appropriate Internet site. In this embodiment, the downloaded coupon management routines are encoded with a unique user identification number, which may be for example the user's email Internet address. When the user requests coupon data packages to be transmitted, the user identification number is encrypted and sent to the Internet site along with the request. Appropriate routines are implemented at the Internet site to decrypt the user's identification number and compare it against a list of valid members in order to ensure the validity of the user.

In another alternative embodiment of the present invention, all coupon data management functions are carried out by the online service provider 2 rather than by the offline coupon data management routines 32. In this case, the speed of access of the online service provider 2 must be high, for example on the order of 28.8 kbps. When high speed communications are used, the need for offline data manipulation is eliminated and all processing can be carried out in an efficient manner while connected to the online provider 2.

The invention claimed is:

1. A system for distributing and redeeming electronic coupons comprising:
    a first server system including a computer processor and associated memory, said first server system being connected by a communications channel to a client system, said first server system being adapted for transmitting an electronic coupon to said client system over said communications channel;
    said client system including a computer processor and associated memory, said client system being adapted for storing said electronic coupon in said memory;
    a second server system connected to said communications channel, said second server system being adapted to establish a connection with said client system and for detecting said electronic coupon stored on said client system, said second server system further being adapted to redeem said electronic coupon; and
    wherein said electronic coupon includes data uniquely identifying the coupon relative to all other coupons transmitted by said first server system;
    wherein said associated memory of said first server system defines a database;
    wherein said database stores coupon offer data defining available coupon offers, user record data defining user records, and targeting criteria applicable to said user records to determine which of said available coupon offers to associate with which of said user records;
    wherein each one of said user records stores
    (1) a user identification that is different from all other user identifications stored in all other records of said user records,
    (2) information regarding coupons redeemed;
    (3) data indicating which of said available coupon offers are to be offered;
    said first server system programmed to respond to receipt over a network of a coupon request prompt from said client system, said coupon request prompt including a particular user identification and identification of a particular one of said available coupon offers, by transmitting from said server system to said client system, data defining a particular coupon, wherein said data defining said particular coupon encodes both said particular user identification and said particular one of said available coupon offers, wherein said first coupon offer is a coupon offer associated in said database with said particular user identification; and
    said first server system being programmed to respond to receipt from a coupon redemption network address of said second server system, of coupon redemption data indicating an attempt to redeem said particular coupon by comparing said coupon redemption data with said information regarding coupons redeemed in said database, to thereby determine whether said particular coupon was previously redeemed.

2. The system of claim 1 wherein said first server system is programmed to store whether said particular coupon has been redeemed in said database.

3. The system of claim 1 wherein said first server system is programmed to disallow redemption of said particular coupon if said comparing indicates that said particular coupon was previously redeemed.

4. A method of distributing and redeeming an electronic coupon comprising the steps of:

establishing a connection over a communications channel between a client and a first server system;

transferring said electronic coupon from said first server system to said client;

establishing a connection over a communications channel between said client and a subsequent server;

said client requesting information from said subsequent server;

said subsequent server detecting said electronic coupon on said client;

establishing a connection between said subsequent server and said first server system, said first server system authenticating said electronic coupon and authorizing the redemption of said electronic coupon; and said subsequent server redeeming said electronic coupon as a function of a transaction initiated between said client and said subsequent server;

wherein said electronic coupon includes data uniquely identifying said electronic coupon relative to all other coupons transmitted by said first server system;

wherein said associated memory of said first server system defines a database;

wherein said database stores coupon offer data defining available coupon offers, user record data defining user records, and targeting criteria applicable to said user records to determine which of said available coupon offers to associate with which of said user records;

wherein each one of said user records stores
(1) a user identification that is different from all other user identifications stored in all other records of said user records,
(2) information regarding coupons redeemed;
(3) data indicating which of said available coupon offers are to be offered;

said first server system programmed to respond to receipt over a network of a coupon request prompt from said client, said coupon request prompt including a particular user identification and identification of a particular one of said available coupon offers, by transmitting from said first server system to said client, data defining a particular coupon, wherein said data defining said particular coupon encodes both said particular user identification and said particular one of said available coupon offers, wherein said first coupon offer is a coupon offer associated in said database with said particular user identification; and said first server system being programmed to respond to receipt from a coupon redemption network address of said subsequent server, of coupon redemption data indicating an attempt to redeem said particular coupon by comparing said coupon redemption data with said information regarding coupons redeemed in said database, to thereby determine whether said particular coupon was previously redeemed.

5. The system of claim 4 wherein said first server system is programmed to store whether said particular coupon has been redeemed in said database.

6. The system of claim 4 wherein said first server system is programmed to disallow redemption of said particular coupon if said comparing indicates that said particular coupon was previously redeemed.

7. A system for electronically distributing and tracking redemption of coupons, comprising:

a server system including a computer processor, associated memory, an input for receiving data, and an output for outputting data;

wherein said memory defines a database;

wherein said database stores coupon offer data defining available coupon offers, user record data defining user records, and targeting criteria applicable to said user records to determine which of said available coupon offers to associate with which of said user records;

wherein each one of said user records stores
(1) a user identification that is different from all other user identifications stored in all other records of said user records,
(2) information regarding coupons redeemed;
(3) data indicating which of said available coupon offers are to be offered;

said server system programmed to respond to receipt over a network of a coupon request prompt, said coupon request prompt including a particular user identification and identification of a particular one of said available coupon offers, by transmitting from said server system to a client computer associated with said particular user identification, data defining a particular coupon, wherein said data defining said particular coupon encodes both said particular user identification and said particular one of said available coupon offers, wherein said first coupon offer is a coupon offer associated in said database with said particular user identification; and said server system being programmed to respond to receipt from a coupon redemption network address of coupon redemption data indicating an attempt to redeem said particular coupon by comparing said coupon redemption data with said information regarding coupons redeemed in said database, to thereby determine whether said particular coupon was previously redeemed.

8. The system of claim 7 wherein said server system is programmed to store whether said particular coupon has been redeemed in said database.

9. The system of claim 7 wherein said server system is programmed to disallow redemption of said particular coupon if said comparing indicates that said particular coupon was previously redeemed.

10. A method for electronically distributing and tracking redemption of coupons, comprising:

defining a database in memory of a server system, said server system including a computer processor, said memory, an input for receiving data, and an output for outputting data, a database;

storing is said database coupon offer data defining available coupon offers, user record data defining user records, and targeting criteria applicable to said user records to determine which of said available coupon offers to associate with which of said user records;

wherein each one of said user records stores
(1) a user identification that is different from all other user identifications stored in all other records of said user records,
(2) information regarding coupons redeemed;
(3) data indicating which of said available coupon offers are to be offered;

said server system responding to receipt over a network of a coupon request prompt, said coupon request prompt including a particular user identification and identification of a particular one of said available coupon offers, by transmitting from said server system to a client computer associated with said particular user identification, data defining a particular coupon, wherein said data defining said particular coupon encodes both said particular user identification and said particular one of said available coupon offers, wherein said first coupon offer is a coupon offer associated in said database with said particular user identification; and said server system responding to receipt from a coupon redemption network address of coupon redemption data indicating an attempt to redeem said particular coupon by comparing said coupon redemption data with said information regarding coupons redeemed in said database, to thereby determine whether said particular coupon was previously redeemed.

\* \* \* \* \*